United States Patent
Morvant (10) Patent No.: US 6,497,416 B1
(45) Date of Patent: *Dec. 24, 2002

(54) WIRE INSERTED NON-EXTRUSION RING

(76) Inventor: John D. Morvant, 14535 Chrisman, Houston, TX (US) 77039

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/766,137

(22) Filed: Dec. 17, 1996

Related U.S. Application Data (63) Continuation-in-part of application No. 08/011,338, filed on Jan. 29, 1993, now Pat. No. 5,551,703, which is a continuation-in-part of application No. 07/950,820, filed on Sep. 24, 1992, now Pat. No. 5,306,021, which is a continuation of application No. 07/512,734, filed on May 21, 1990, now abandoned, which is a continuation of application No. 06/833,690, filed on Feb. 25, 1986, now abandoned.

(51) Int. Cl.$^7$ ................................. F16L 17/00
(52) U.S. Cl. ................. 277/602; 277/584; 277/626; 277/627; 277/650
(58) Field of Search ............. 277/188 A, 188 B, 277/229, 230, 227, 235 A, DIG. 6, 226, 123, 602, 584, 626, 627, 650

(56) References Cited

U.S. PATENT DOCUMENTS

| | | | |
|---|---|---|---|
| 731,458 A | * | 6/1903 | Hughes et al. |
| 1,171,090 A | * | 2/1916 | Cook |
| 2,143,106 A | * | 1/1939 | Freedlander |
| 2,376,039 A | * | 5/1945 | Driscoll et al. |
| 2,400,533 A | * | 5/1946 | Buffington |
| 2,932,535 A | * | 4/1960 | Peickii et al. |
| 3,341,211 A | * | 9/1967 | Houghton et al. |
| 3,361,432 A | * | 1/1968 | Usher |
| 3,690,685 A | * | 9/1972 | Porner et al. |
| 4,296,806 A | * | 10/1981 | Taylor et al. |
| 4,428,592 A | * | 1/1984 | Shaffer |
| 4,475,573 A | * | 10/1984 | Hindman |
| 4,524,982 A | * | 6/1985 | Hertz, Jr. |
| 4,559,248 A | * | 12/1985 | Sumiyoshi et al. |
| 4,730,835 A | * | 3/1988 | Wilcox et al. |
| 4,753,444 A | * | 6/1988 | Jackson et al. |
| 4,811,959 A | * | 3/1989 | Bullard et al. |
| 4,862,967 A | * | 9/1989 | Harris |
| 4,876,158 A | * | 10/1989 | Onuki et al. |
| 4,891,117 A | * | 1/1990 | Gardner, Sr. |
| 4,941,669 A | * | 7/1990 | Fujisawa et al. |
| 5,075,174 A | * | 12/1991 | Pyle |
| 5,165,703 A | * | 11/1992 | Morvant |
| 5,306,021 A | * | 4/1994 | Morvant |
| 5,615,896 A | * | 4/1997 | Morvant ............ 277/530 |

FOREIGN PATENT DOCUMENTS

| | | | |
|---|---|---|---|
| GB | 1019523 | * | 2/1966 |
| GB | 1075111 | * | 7/1967 |

* cited by examiner

Primary Examiner—Lloyd A. Gall
Assistant Examiner—Christopher Boswell
(74) Attorney, Agent, or Firm—David M. Ostfeld

(57) ABSTRACT

A back-up ring is disclosed wherein the ring is a knitted mesh section substantially surrounded by an outer coating covering substantially all of the knitted wire mesh section, the coating having contact with the outer and inner surface of an annulus.

18 Claims, 8 Drawing Sheets

FIGURE 5
KNIT PATTERN

FIGURE 6
ROLLED STOCKING

FIGURE 7
WINER IN APPLICATION
WWW 9-1-93

WIRE INSERTED NON-EXTRUSION RING

CROSS REFERENCE TO RELATED APPLICATION

This application is a continuation-in-part of U.S. application Ser. No. 08/011,338 filed Jan. 29, 1993 for Pack Off Seal now U.S. Pat. No. 5,551,703, which is a continuation-in-part of U.S. application Ser. No. 07/950,820, filed Sep. 24, 1992 now U.S. Pat. No. 5,306,021 entitled M-PAC Seal which is a continuation of U.S. application Ser. No. 07/512,734, filed May 21, 1990 now abandoned entitled M-Pac Seal, which is a continuation of U.S. application Ser. No. 06/833,690, dated Feb. 25, 1986, now abandoned.

FIELD OF INVENTION

The present invention relates to anti-extrusion rings and, more particularly, to wire encapsulated extrusion rings.

BACKGROUND OF THE INVENTION

Seals have been used to isolate fluids at various pressures and temperatures. Such seals have existed for use in packing rings, seal rings, piston rings and gland structures in industrial equipment, such as cylinders, pumps, hydraulics and valves, and in oil field equipment, such as down hole tools and surface equipment, requiring seals, for example, against high pressure and low pressure liquids and gases. Typically, these seals are annular seals.

However, under pressure, such seals may be eroded or destroyed and require back-up rings to prevent extrusion of the seal rings. See, for example, U.S. Pat. No. 4,234,197, issued Nov. 18, 1982, Amancharla, et al, entitled Conduit Sealing System. Such systems, however, are bulky and require additional length; At times they require structures with different materials as back-up rings and require a modules of materials at escalating values, which must be maintained even at high temperatures, which is not possible.

Another illustration of seals, as opposed to back-up rings, used in the prior art is shown in U.S. Pat. No. 4,524,982 to Hertz, issued Jun. 25, 1985 and entitled Seal for Aggressive Environments. Hertz merely discloses elastomer-impregnated windings of asbestos yarn impregnated into an elastomer to illustrate a seal ring as opposed to a back-up ring, a sort of "steel belted radial" of seals. For similar encapsulated rings, see also, U.S. Pat. No. 4,423,544 to Kashmerick, issued Jan. 3, 1984 for A Method of Making Composite Gasket. For back-up rings, see also, U.S. Pat. No. 3,810,639, issued May 14, 1974, to Scanell, entitled Frangible Back-up Ring for Sealing Rings.

It is an object of the current invention to avoid the distortions and other problems of the prior art through the use of a non-homogeneous wire encapsulated anti-extrusion ring.

SUMMARY OF THE INVENTION

A wire encapsulated back-up ring is disclosed having a co-efficient of thermal expansion while the ring is under pressure which is less than or equal to the surrounding gland metal. The upper surface of the back-up ring is concave to allow pressure to energize the back-up ring. The outer and inner surfaces normally remain in contact with adjacent portions of the gland and maintain an anti-extrusion barrier for a sealing ring. The anti-extrusion element also has a lower surface adapted to mate with or be a support member behind the anti-extrusion element. If the back-up ring is not also the support member, the support member surface may have a shape as required to hold the element or elements in place. The body of the element includes two parts. The first part is a wire mesh, used for reinforcement. Such a part would typically be formed in a vee shape, but may deviate to conform to the support member. The second part is a coating of sealing material which would encapsulate the wire mesh shape. The coating may vary in thickness around the wire mesh shape. The coating thickness would depend upon the strength requirement of the seal.

BRIEF DESCRIPTION OF THE DRAWINGS

For a further understanding of the nature and objects of the present invention, reference is made to the following drawings which like parts are given like reference numerals and wherein.

DESCRIPTION OF THE INVENTION

Figure 1:
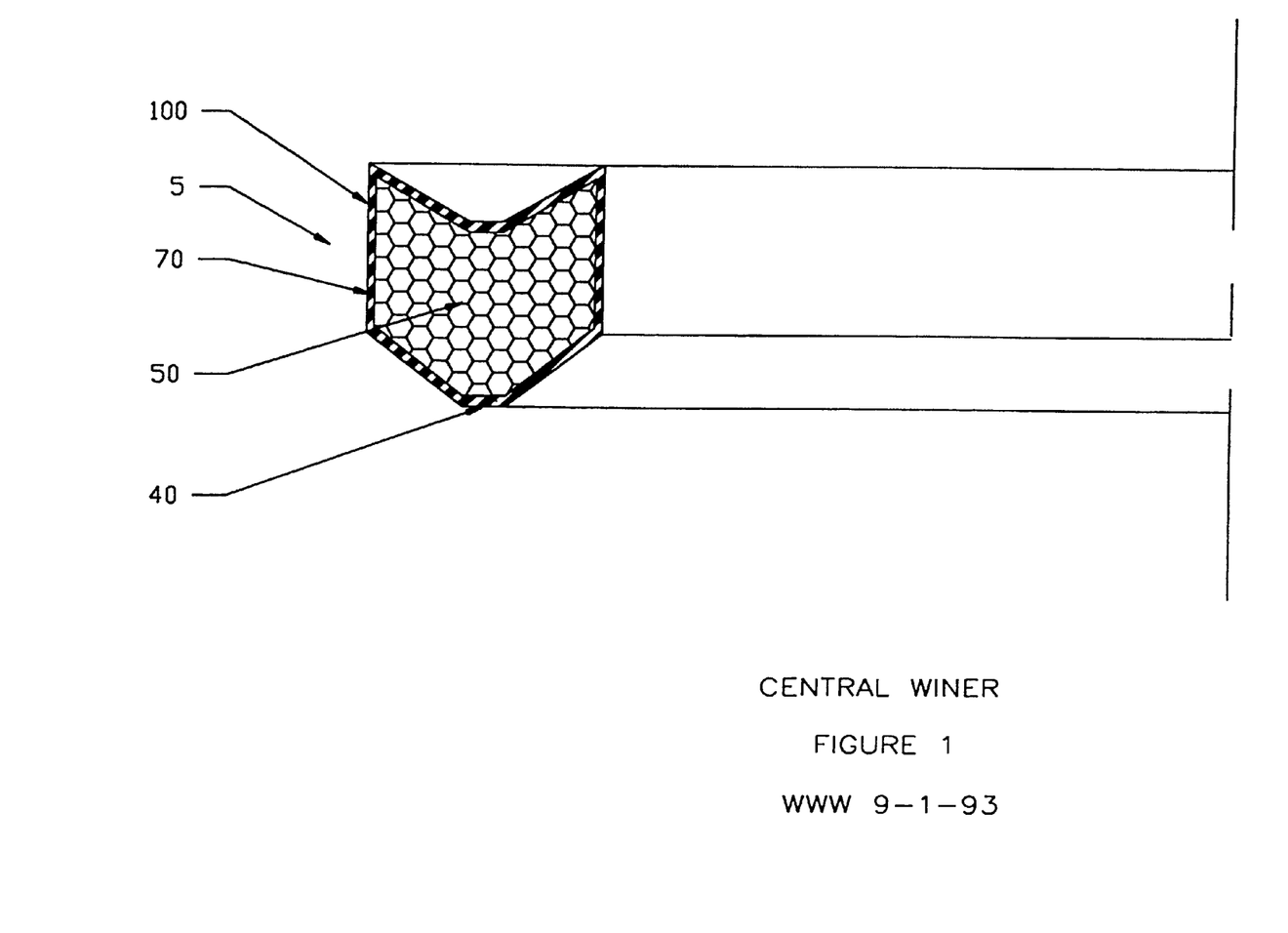
FIG. 1 is a fragmented side cross-sectional view of the V-Ring of the preferred embodiment of the present invention.

As seen in FIG. 1, the back-up ring 5 of the present invention is shown having wire mesh vee shape 50 with an outer coating 100 of sealing material 70. This permits back-up ring 5 with the wire mesh 50 to have increased physical strength. The back-up ring 5 retains nearly all physical strength at high temperatures and thermally expands negligibly compared to the typical vee ring. The materials are such that a co-efficient of thermal expansion while the back-up ring 5 is under pressure is less than or equal to the surrounding gland metal.

Figure 2:
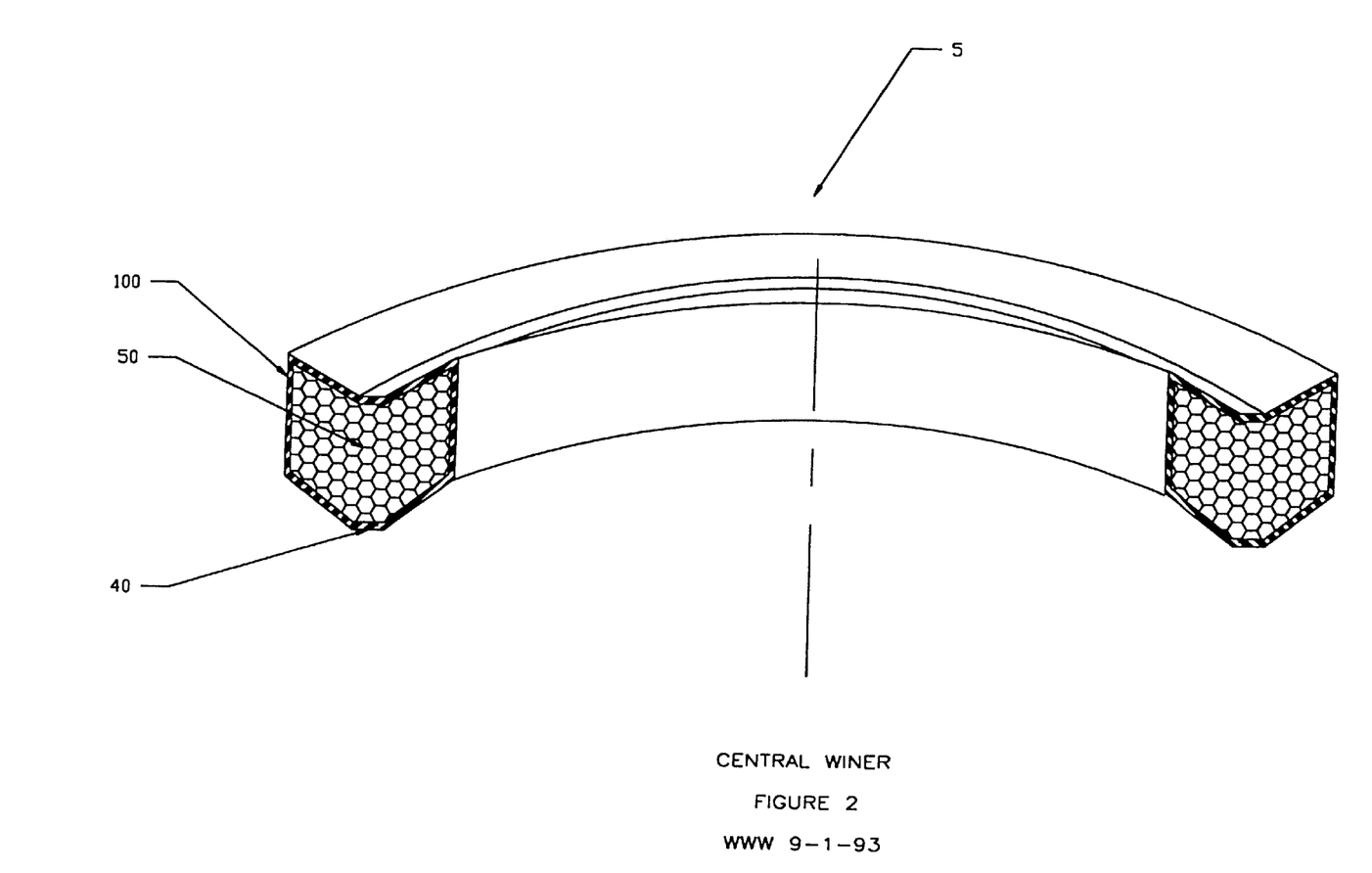
FIG. 2 is a profile view of the V-Ring of one embodiment of the present invention.

Referring to FIG. 2, the surfaces of back-up ring 5 include an upper surface 10, which has a modified vee shape with a horizontal portion 11 and angled sides 12, a vertical inner surface 20 and a vertical outer surface 30. Surfaces 20, 30 are preferably symmetrical. Surface 10 is concave to allow pressure to energize surfaces 20, 30 of back-up ing 5. Surfaces 20, 30 remain in contact with their adjacent conduits 120, 130, respectively, and maintain a barrier to flow of the material of a seal ring 75 (FIG. 7) at those contact areas. The lower surface 40 of back-up ring 5 is of a modified vee shape and adapted to mate with a support member 60 behind the seal 5. The upper surface 80 of the support member 60 may have any shape required to hold the back-up ring 5 in place.

Thus, the body of the back-up ring 5 has the shape set out above and comprises two parts. The inner part of the body of back-up ring 5 includes wire mesh reinforcement 50. Wire mesh reinforcement 50 is typically formed into a vee shape but may deviate slightly to conform to the upper surface 80 of support member 60.

Figure 7:
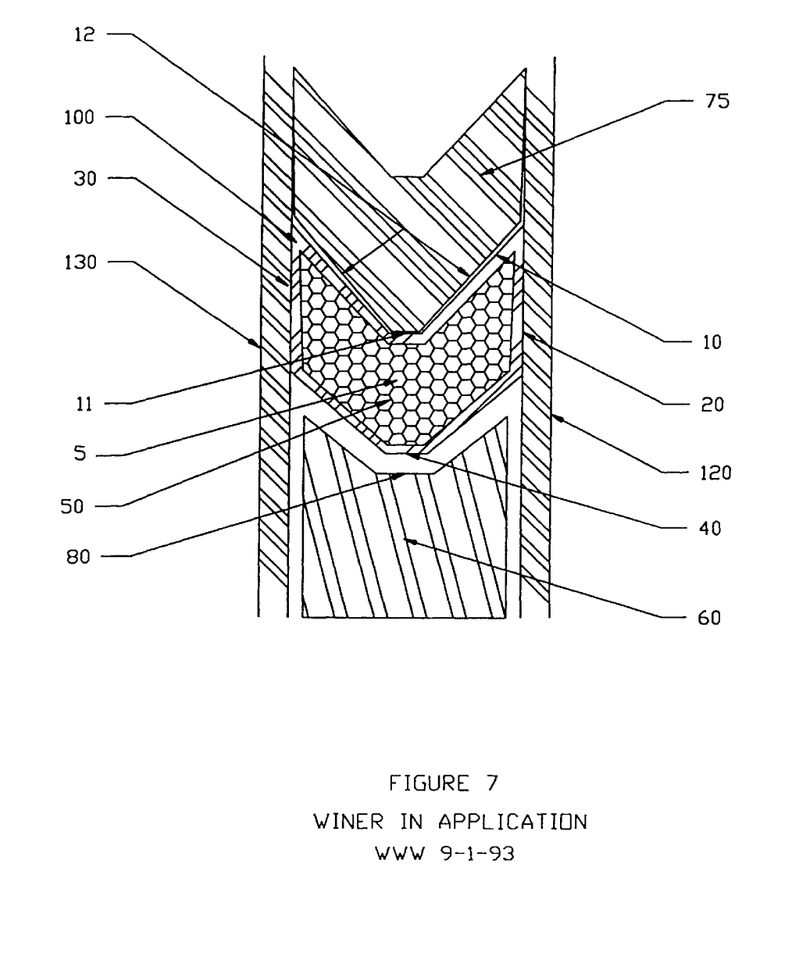
FIG. 7 is an illustration of the back-up element in place in a gland.

The back-up ring 5 as depicted in FIG. 7 is shown annularly backing up a seal 75 between two conduits 120, 130 by two surfaces 20, 30, respectively. Both surfaces have a coating 100 of sealing material 70. Such material 70 may be elastomeric, plastic, bonded fibers, or flexible metals, including materials discussed above. The durometer hardness of the material of the coating 100 is preferably between 70 and 90 but should not be considered limited to such 70–90 durometer. As to the preferred material of the coating 100, it is recommended that a rubber or rubber type polymer be used for the material 70 which has a 50 to 95 durometer reading on the Shore A durometer scale. The durometer of the material chosen will be such that the desired sealing effect can be satisfactorily obtained. Any material 70 used in a typical vee ring is acceptable. However, other materials 70 which are not resilient may be used, such as metals, some polymers, or flexible inorganic compounds. The coating 100 of material 70 provide shape maintenance and a non-permeable barrier to well fluids to avoid well fluids from seeping into the mesh which might cause explosive decompression.

Figure 8:
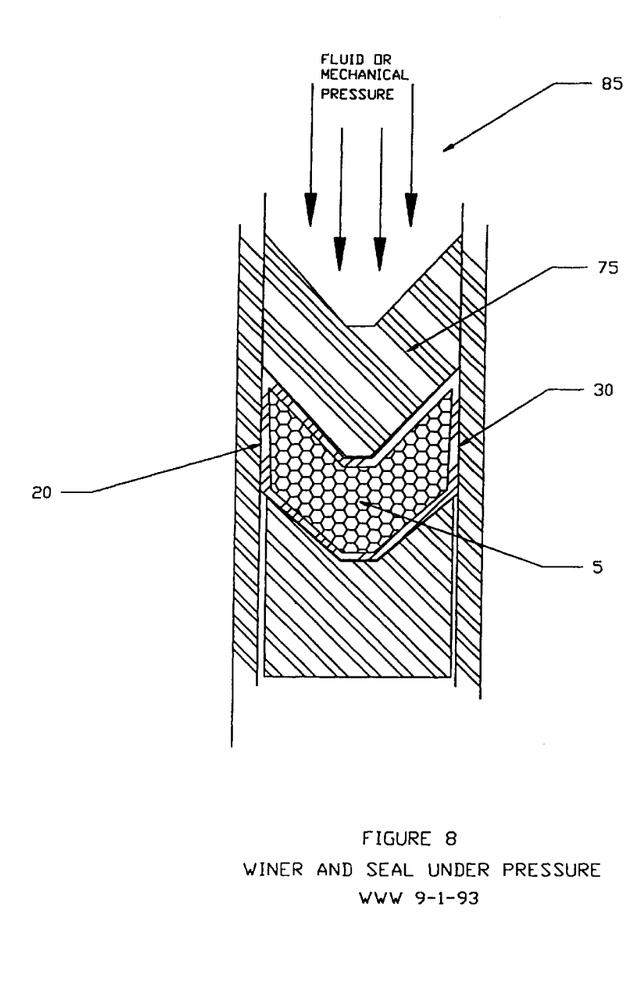
FIG. 8 is an illustration of the made up seal under pressure.

Surfaces 20, 30, preferably straight sided, remain in contact with the surfaces of their adjacent conduits 120, 130, respectively, during the operation of the back-up ring 5. Because of the shape of surface 10 and the angles of all said surfaces 10, 20, 30 relative to each other, pressure tends to increase contact forces between surfaces 20, 30 with conduits 120, 130, respectively. The vee shaped upper surface 10 is preferably undercut as shown in FIG. 7, such that the back-up ring 5 is pressure sensitive. Further, surface 10 is thinner than for a back-up ring for a seal and does not project as far above the mesh portion as a seal ring. Further, the surfaces 20, 30 are preferably straight and do not form an interference with conduits 120, 130 as with a seal ring. Pressure 85 acting on surface 10 through seal 75, as shown in FIG. 8, is converted into load which is communicated through the body of back-up ring 5 to surfaces 20, 30, forcing them in back-up against conduits 120, 130.

Figure 5:
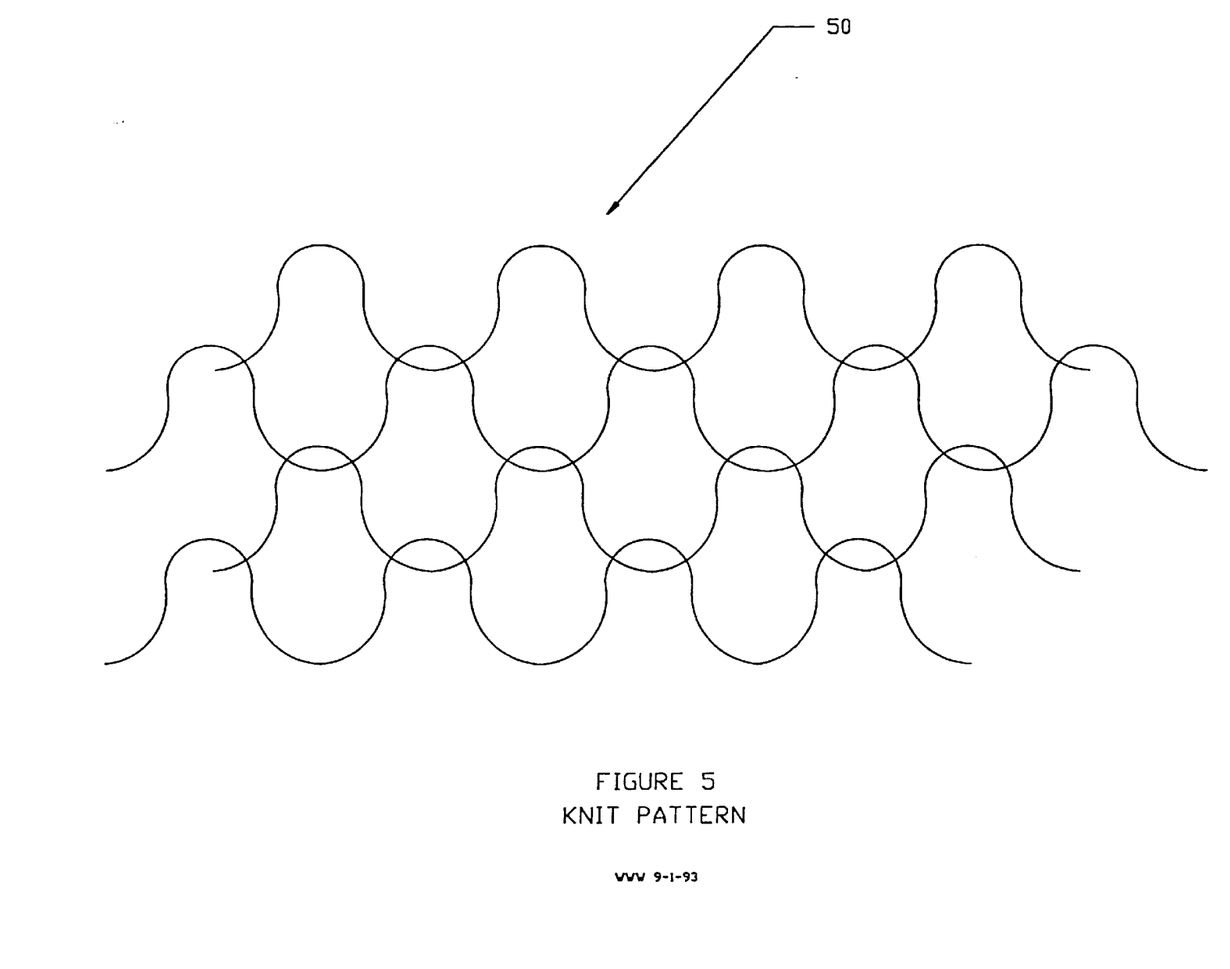
FIG. 5 is the knit pattern of the wire mesh used in the metal mesh portion of any preferred embodiment in the present invention.

The knitted wire mesh reinforcement 50 may be of any metallic or non-metallic material that can be drawn into a 0.014 inch diameter wire, or less, and knitted as in FIG. 5. Such knitted wire mesh is that which is well known in the art, such as shown by Metex Catalogs. Metallic materials that can be used include stainless steel, aluminum, copper, brass and the like. Selection of the material is primarily dependent on the application whether static or dynamic. Other non-metallic materials that can be used include organic fibers, inorganic fibers, polymeric filaments, or metallic yarns when knitted as shown in FIG. 5.

Figure 6:
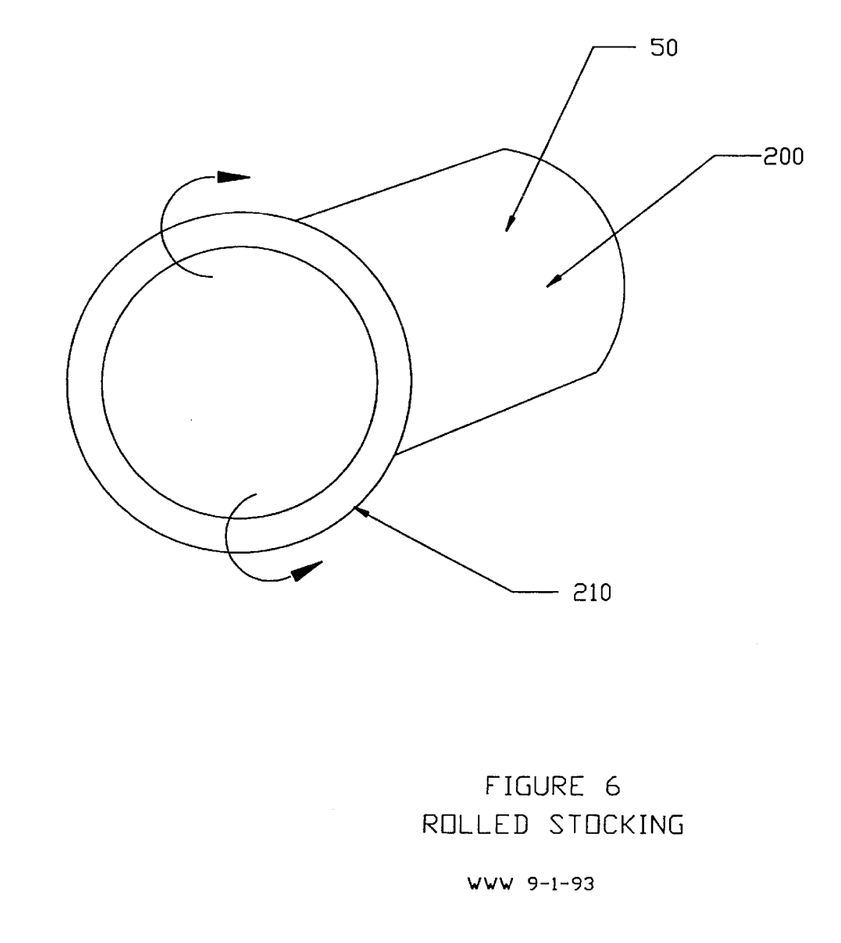
FIG. 6 is an illustration of the mechanism for rolling the wire mesh from a tube of wire mesh to form the wire mesh portion of the back-up rings.

For use, a particularly preferred type of knitted material comprises a continuous series of interlocking loops knitted in the form of a tube or stocking 200. The tube 200 is rolled on itself into a donut shape 210 as seen in FIG. 6. The shape is approximate to the final back-up ring 5 shape. The donut shape is then compressed by compression molding and pre-formed into the vee shape of back-up ring 5 of FIG. 1. Density of the wire mesh reinforcement 50 will vary according to application but usually is recommended to be between 40–70% of the material of the mesh ring, determined by volume and weight. This compressed shape is then coated with a flexible seal material 70. Such coating 100 can be applied by vulcanizing or can be by a binder such as an elastomeric material, or a phenolic material or some other such synthetic or natural material, either thermo setting or thermoplastic in nature, including a fabric reinforced thermo setting or thermoplastic material, or a mixture of thermoplastic/thermo setting material or a thermoplastic elastomer, or various combinations of the above, which can be coated on the knitted material for the wire mesh reinforcement 50, adding chemical adhesion to the mechanical bonding. As a further example of the breadth of materials possible, the term "thermal setting", as used herein, applies to those resins, generally synthetic in nature, which solidify or set on heating and cannot be remelted. Non-limiting examples of such thermal setting resins include phenolics, amino resins, polyesters, epoxies, silicones and the like. As another example of the breadth of materials possible, the term "thermoplastic", as used herein, applies to resins, generally synthetic in nature, that may soften by heat and then regain their control properties upon cooling. Non-limiting examples of such thermoplastic materials include nylon, polyethylene, polypropylene, cellulose and acrylic resins, polyurethane, synthetic rubbers, teflon, nylon, ryton, polycarbonates and the like. The term "fabric or fibrous material", as used herein, refers to any material obtained by weaving or other such techniques wherein the matrix comprises a latticework of web or thread-like elements. Numerous materials fall into this class such as, for example, cotton, asbestos, fiberglass, nylon, polyesters, linen, rayon and the like. Furthermore, blends of various materials such as cotton-polyester fabrics, rayon-polyester fabrics and the like may be employed.

The outer part of the body of back-up ring 5 includes a coating 100 of sealing material 70 which wholly or partially encapsulates the wire mesh reinforcement 50. Typically and preferably, the coating 100 will completely surround the wire mesh reinforcement 50. However, the coating 100 does not need to extend over the entire wire mesh reinforcement shape. Also, the coating 100 may vary in thickness around the shape of the wire mesh reinforcement 50. Thickness of coating 100 may be specified based on strength requirements of the seal 5.

Strength of the back-up ring 5 is determined by the physical properties of the entire body and is measured by the ability of the ring to remain a back-up ring at a given pressure. Typically the physical properties of tensile strength, extrusion resistance, and compressive modulus of the body materials are in direct relation to the strength of a back-up ring 5. Relative to a typical vee ring, the wire mesh reinforcement member 50 increases the value of all said physical properties of the entire seal body.

Figure 3:
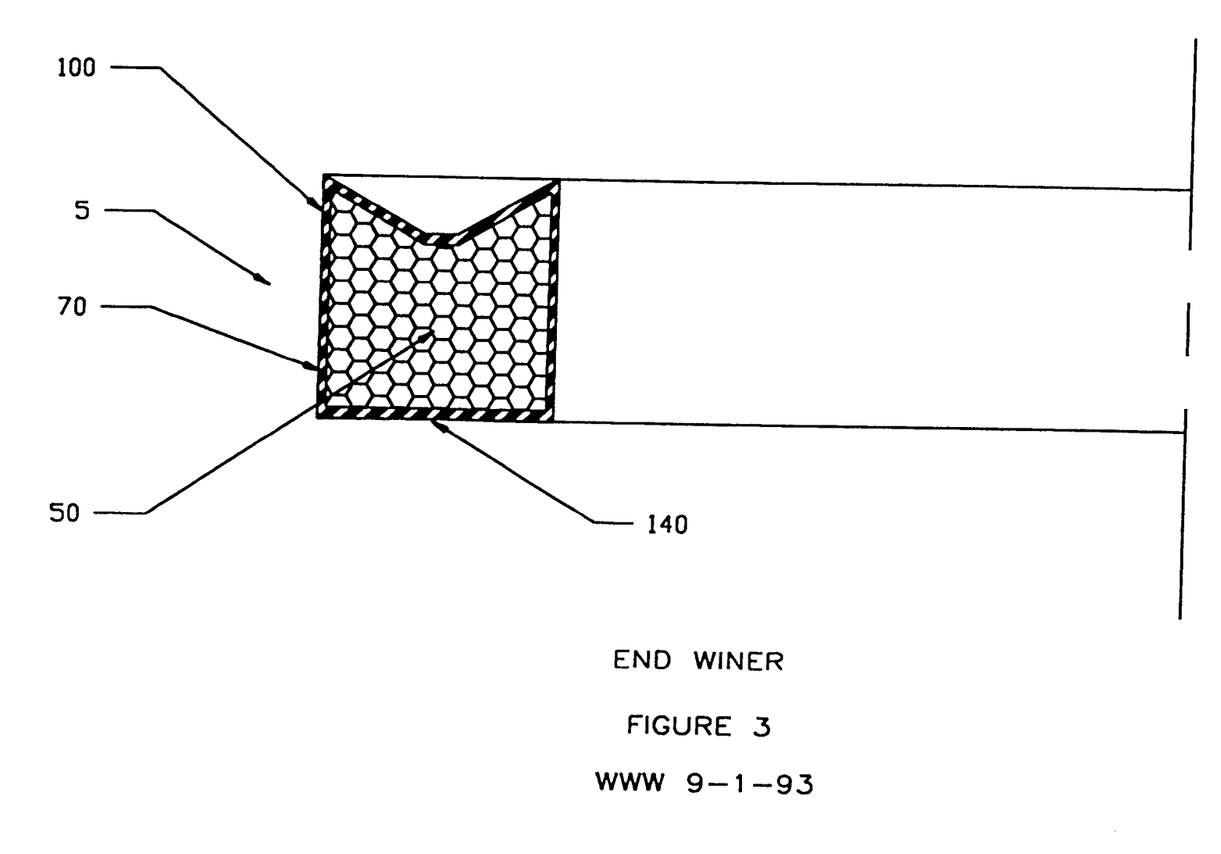
FIG. 3 is a fragmentary cross-section view of the seal ring of FIG. 4.
Figure 4:
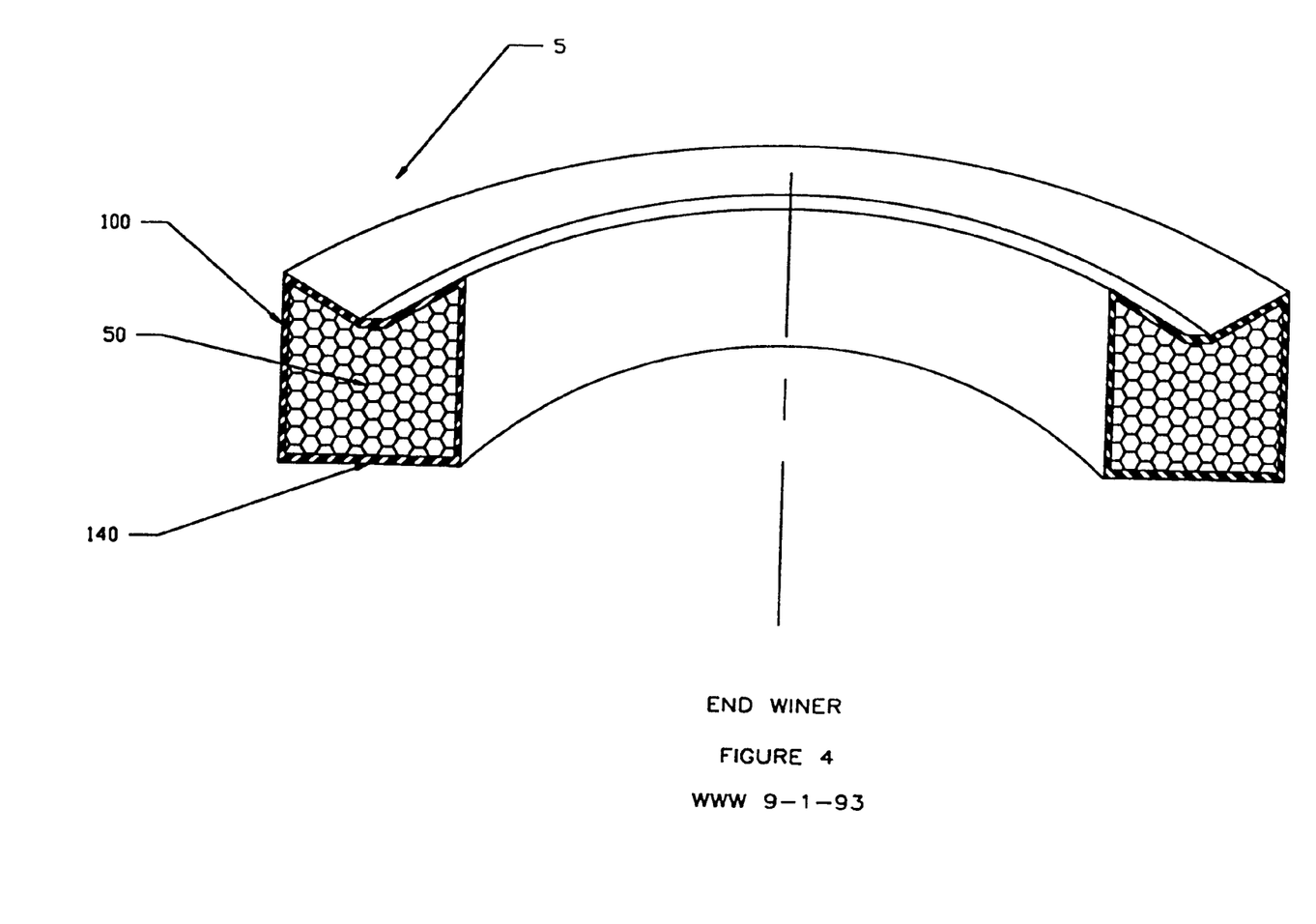
FIG. 4 is a second embodiment of the present invention.

FIG. 3 shows a varying geometry that the back-up ring 5 may embody. Its cross section shown a flat bottom 140 so that besides being a back-up ring, it also acts as a support member.

While in the description given above and as depicted in the drawings, the rings have been described with particular reference to annular members, such as a packing, it is to be understood that the invention is not so limited. Thus it is not necessary that the generally non-metallic coating 100 or the knit wire mesh reinforcement 50 be annular in configuration. Depending on the type of usage to which the ring is put, the shape can have virtually any configuration. For example, the shape may be elliptical, square, hexagonal or virtually any other shape. Whatever its shape, the back-up ring 5 would be provided with the two portions for its body. In general, and except in the case of an elongate strip type packing material, the back-up ring 5 will generally have an opening or passageway therethrough which usually is at least partially defined by at least a portion of the body of the back-up ring 5, sealing being effected in the region generally contiguous in surrounding the opening. Thus, a ring device having a non-annular configuration could be used as a back-up between the plug or cock and the body of a plug valve to ensure that when the valve was either in the open or the closed position, there was no seal material leakage from the flow passage into the body or the valve in which the plug is mounted. In static applications, the back-up ring device would have a highly asymmetrical configuration as for example in a gasket which has a first, relatively large, generally solid body section attached to a second, lesser volume body section which defined an opening, the opening in the gasket registering with the similar openings in removably fixed parts so as to ensure back-up between the parts at this juncture.

Because many varying and different embodiments may be made within the scope of the inventive concept herein taught including equivalent structures or materials hereinafter thought of, and because many modifications may be made in the embodiments herein detailed in accordance with the descriptive requirements of the law, it is to be understood that the details herein are to be interpreted as illustrative and not in a limiting sense.

What is claimed as invention is:

1. A seal system for sealing an inner surface and an outer surface of an annulus, comprised of:
   a back-up ring;
   a seal with a lower surface for sealing the inner surface and the outer surface of the annulus;
   said back-up ring including a knitted mesh member;
   an outer coating covering substantially all of said mesh member, said outer coating including a first surface adjacent to and in contact with the outer surface of the annulus and a second surface adjacent to and in contact with the inner surface of the annulus prior to makeup of said seal;
   said mesh member having an upper surface covered by said coating, said upper surface and coating conforming to and adjacent said lower surface of said seal.

2. The seal system of claim 1, wherein said outer coating includes:
   an upper surface having a modified vee shape with at least two angled sides in cross section;
   said first surface includes an outer, vertical surface depending from said upper surface;
   said second surface includes an inner, vertical surface depending from said upper surface;
   a lower surface joining said outer surface and said inner surface.

3. The seal system of claim 2, wherein said outer coating is of a material selected from a group consisting of elastomerics, plastics, flexible inorganic compounds, bonded fibers and flexible metals.

4. The seal system of claim 3, wherein said material has a durometer hardness between 50 and 95.

5. The seal system of claim 3, wherein said material has a durometer hardness between 70 and 90.

6. The seal system of claim 2, wherein said vee shape is undercut.

7. The seal system of claim 1, wherein said knitted mesh is of material that can be drawn.

8. The seal system of claim 7, wherein said knitted mesh includes cylindrical shaped components having a diameter less than or equal to 0.014 inches.

9. The seal system of claim 7, wherein said material is a metal wire.

10. The seal system of claim 7, wherein said material is a non metal.

11. The seal system of claim 7, wherein said material is a combination of metal and non metal.

12. The seal system of claim 7, wherein the density of said knitted mesh is between forty percent and seventy percent of said material.

13. An annular back-up ring for backing up a seal located in an annulus, the seal having a lower seal surface for sealing an inner surface of the annulus and for sealing an outer surface of the annulus, comprised of:
   a knitted mesh member;
   an outer elastomer coating covering substantially all of said knitted mesh member, said outer coating including a first anti-extrusion sealing surface sized to extend adjacent to and in contact with the outer surface of the annulus and a second anti-extrusion sealing surface sized to extend adjacent to and in contact with the inner surface of the annulus prior to makeup of the seal;
   said mesh member having an upper surface with said coating shaped to conform to the shape of the lower surface of the seal.

14. The ring of claim 13, wherein said anti-extrusion sealing surfaces are vertical surfaces, parallel to the outer surface and inner surface of the annulus.

15. The ring of claim 13 wherein said coated mesh member has a co-efficient of thermal expansion under pressure less than or equal to the co-efficient of thermal expansion of the surrounding annulus.

16. The ring of claim 13, wherein said upper surface includes means for nonmechanical pressure energizing said first anti-extrusion sealing surface and said second anti-extrusion sealing surface.

17. A seal system for sealing an inner surface and an outer surface of an annulus, comprised of:
   a back-up ring;
   a seal with a lower surface for sealing the inner surface and the outer surface of the annulus;
   said back-up ring including a knitted mesh member;
   an outer coating covering substantially all of said mesh member, said outer coating including a first surface adjacent to and in contact with the outer surface of the annulus and a second surface adjacent to and in contact with the inner surface of the annulus prior to makeup of said seal;
   said mesh member having an upper surface covered by said coating, said upper surface and coating conforming to and adjacent said lower surface of said seal;
   a support member having an upper surface, said mesh member having a lower surface conforming to the shape of said upper surface of said support member.

18. The seal system of claim 17, wherein said upper surface of said support member is smaller than said lower surface of said mesh member.

* * * * *